United States Patent [19]

Rossi et al.

[11] 4,107,739
[45] Aug. 15, 1978

[54] SYSTEM UTILIZING INTEGRATION AND MOTION EVALUATION FOR REDUCING NOISE IN VIDEO SIGNAL

[75] Inventors: John P. Rossi, New York, N.Y.; Marvin A. Stern, Stamford, Conn.

[73] Assignee: CBS Inc., New York, N.Y.

[21] Appl. No.: 826,292

[22] Filed: Aug. 22, 1977

[51] Int. Cl.² .................. H04N 9/535; H04N 5/21
[52] U.S. Cl. ........................... 358/167; 358/36
[58] Field of Search .............. 358/22, 36, 167, 181, 358/183

[56] References Cited

U.S. PATENT DOCUMENTS 4,064,530 12/1977 Kaiser et al. ........................ 358/36

Primary Examiner—John C. Martin
Attorney, Agent, or Firm—Spencer E. Olson

[57] ABSTRACT

A system for reducing noise in a television signal utilizing integration and including a storage device for storing a television signal, and a summing device for adding a fractional amplitude portion of the signal stored in the storage device to a fractional amplitude portion of an incoming video signal, and operative automatically to change the fractional amplitude portion of the stored signal fed to the summing device as a function of the difference between stored and present signals, thereby to change the integration time constant of the system to accommodate for motion between the incoming signal and the stored frames, is improved by eliminating from the noise-reduced output signal troublesome transients caused by not changing at the appropriate time the fractional amplitude portion of the stored signals fed back to the summing device. This problem is overcome by generating in response to the difference between the incoming and stored video signals a gating waveform during the existence of which an increased portion of incoming video is coupled to the output of the system, delaying the incoming and stored video signals by an arbitrary amount sufficient to ensure that the onset of the gating waveform occurs sufficiently in advance of the delayed incoming and stored video signals as to be anticipatory of the delayed arriving and stored signals, and delaying the turn off or termination of the gating waveform thereby to delay the return to a condition of coupling a lower value of the fractional amplitude portion of the incoming video signal than occurred during the gating waveform.

2 Claims, 4 Drawing Figures

SYSTEM UTILIZING INTEGRATION AND MOTION EVALUATION FOR REDUCING NOISE IN VIDEO SIGNAL

BACKGROUND OF THE INVENTION

This invention relates to systems for processing television signals, and is more particularly concerned with systems for reducing noise in color video signals.

In the copending application Ser. No. 740,576, now U.S. Pat. No. 4,064,530 of Arthur Kaiser, James Kenneth Moore and William E. Glenn, Jr. entitled "Noise Reduction System for Color Television" filed Nov. 10, 1976 and assigned to the same assignee as the present invention, the disclosure of which is hereby incorporated by reference, there is described a system which is effective to reduce noise in both the luminance and chrominance components of a color television signal, even in the presence of significant motion between successive frames. The system utilizes frame store integration and includes a delay or storage device capable of storing a single television frame, a summing device for adding a fractional amplitude portion of the signal stored in the storage device to a fractional amplitude portion of the present, or incoming, video signal. The system functions as a recursive filter and is operative automatically to change the fractional amplitude portion of the stored signal fed back to the summing device as a function of the difference between stored and present signals thereby to change the integration time constant of the filter to accommodate for motion between the present signal and the stored frames. The present invention is directed to a feature of the system disclosed in the copending application; the following summary description of the noise reducing system will indicate the problem solved by the invention.

Referring to FIG. 1, which corresponds to FIG. 1 of the copending application, and considering a digital implementation of the noise reducing system, the video input signal on input line 10, which may be encoded by the pulse code modulation (PCM) technique described in U.S. Pat. No. 3,946,432 utilizing an 8-bit code, is applied via a variable attenuator 12 to one input terminal of a summing circuit 14. The output signal from the summer 14 is applied to a delay device 16 having a delay of substantially 525H; H represents one television line interval, which means that the delay device introduces a one frame delay since there are 525 lines per frame in the NTSC system. The output of delay device 16 is applied through a chroma inverter 18 and a variable attenuator 20 to a second input terminal of the summer 14. Attenuators 12 and 20, shown very schematically, are ganged and respectively introduce a transmission constant of $(1 - a)$ and "$a$." That is, a fractional portion $(1 - a)$ of the amplitude of the incoming or present video signal is applied as one input to the summer 14 and a fractional portion "$a$" of the amplitude of the stored video signal is applied to the other summer input. It will be evident that if the value of "$a$" is increased, for example, the proportion of the stored signal applied to the summer increases, and the proportion of the present video signal applied to the summer decreases. Conversely, if "$a$" is decreased, a larger proportion of the present signal and a smaller proportion of the stored signal are applied to the summer.

If there is no motion between successive frames, the video signals representing the successive frames will be identical in information content; only the amount of noise in each will differ. When a multiplicity of such identical signals are summed, in the manner just described, the result is a signal identical to any one of the summed signals and of the same magnitude as the incoming signal by virtue of the fact that the sum of "$a$" and $(1 - a)$ is always unity. However, when random noise is present in the video signal, which may vary in amount and distribution from frame to frame, is summed, it tends to be canceled, or in any case is not reinforced as is the periodic video signal. However, motion between the incoming video signal and the stored frames affects the video picture sharpness and, in accordance with another aspect of the system described in the copending application, the motion problem is solved by detecting motion between stored frames and the present signal as the picture proceeds element-by-element through the system, and in response to the evaluation of such motion changes the value of the transmission factor "$a$" (and consequently $(1 - a)$) so as to alter the contribution of the stored past signals to the noise-reduced video output signal. If a picture element from the same scene object in the stored signals is sufficiently different in amplitude from the same element in the present video signal, the past history of that picture element is ignored and only the present signal is transmitted to the output terminal. Although there would be no signal-to-noise improvement for that particular picture element, it should be noted that, for the most part, motion is observed only on the boarders and in the fine detail of objects, and not on the broad areas of objects; that is, it is the interface between an object in a scene and its background that makes motion detectable in the displayed television picture. With this in mind, the system is operable in response to detected motion to alter "$a$" and $(1 - a)$ in such a way as to accommodate motion, in the limit allowing "$a$" to go to zero, that is, to transmit only the present signal to the output terminal. In the implementation described in the aforementioned application the "pixel"-by-"pixel" comparison of the stored past frames with the corresponding "pixels" of the incoming video signal is performed at three times the color subcarrier frequency of the video signal, or 10.7 MHz in the NTSC system; thus, every 93 nanoseconds the system is called upon to make a judgment as to the amount of stored signal (that is, the proportion "$a$") that is to be fed back to the summer 14. By reasons of the high speed of operation and the nature of the comparison process, delays sometime occur in making the decision to make a change in the value of "$a$" which, in turn, produce certain undesirable artifacts in the displayed television picture.

The nature of this problem will be seen from an examination of FIG. 2 wherein the waveform A depicts an edge of a surface of an object in a scene in a static condition; that is, the various picture elements along a single line of the video signal are defined by the ascending leading edge of the pulse. Associated with the waveform A (which may be the stored signal) are upper and lower threshold levels, both designated $V_{thresh}$, of predetermined magnitude below and above which, respectively, decisions are made respecting the pulse. If one desired to determine whether a difference exists between two signals, one stored and the other incoming, and there were no noise to be reckoned with, the threshold could take a variety of values, including practically zero. Unfortunately, significant noise is usually present and consequently, in order that the system not misleadingly recognize noise as motion, it is necessary to provide a threshold at some finite, compromise value. Waveform B (which may be regarded as the incoming video) represents the same picture points as waveform A, moved to the right with respect to waveform A, signifying that motion has occurred. For example, if waveform A occurs at time $t_O$, waveform B may occur at $(t_O + \Delta t)$, which in the case of an NTSC television signal, $\Delta t$ might be 1/30th of a second. Threshold levels of the same magnitude as these associated with waveform A are shown in association with waveform B.

To detect motion between the incoming signal B and the stored signal A, the signals are compared element-by-element, and applying the rule employed in the system of the copending application, whenever the difference between signals A and B exceeds the threshold level, the incoming signal B is switched to the output terminal, and, conversely, whenever the difference between signals A and B (it matters not which is the larger) is below the threshold, the stored signal A is transmitted to the output terminal along with a small amount of incoming signal. Waveform C in FIG. 1 is a plot of the difference between waveform A and waveform B, specifically, A minus B, and has the same arbitrary threshold levels associated therewith as in the case of waveforms A and B. Recalling that when the difference between the A and B waveforms exceeds the threshold level the system decides to use the incoming signal B, or some greater fraction thereof, the control function depicted by waveform D results. That is, starting at the left end of waveform C, so long as the value of the difference is less than the threshold level, signal A is to be coupled to the output with very little new video, and when the difference exceeds the threshold, at time $T_1$, the system abruptly switches to signal B and continues to couple signal B to the output until time $T_2$, at which time the difference signal falls below the threshold level, whereupon the signal A is again coupled to the output of the system. Thus, there is provided an on-off control function, which corresponds to the maximum feedback of stored signal and full bypass, respectively, in the system described in the copending application.

When the control function depicted by waveform D is applied to waveforms A and B, a signal having the waveform shown at E, which is not a true replica of what is desired, is coupled to the output of the system. Instead of getting only waveform B during the "up" portion of the control function waveform D during the period $T_1$ to $T_2$, that portion of the signal A which precedes $T_1$ is coupled to the output, and, since the time $T_2$ occurs before waveform B has reached the upper threshold level, less than all of the waveform B is coupled to the output, causing a discontinuity at the upper end of the waveform E. These "glitches" in the B signal transmitted to the output terminal cause distracting artifacts in the television picture, an unacceptable by-product of the noise reducing function of the system.

Another problem inherent in the system as described in the aforementioned copending application is that the on-off control function causes the output of the system to consist of either a large fraction of the incoming video signal or a large fraction of the stored video signal. Since, in general, the stored signal will exhibit a much lower noise level than the incoming video, often more than 8 db lower, as the system switches from a large fraction of stored video to a large fraction of incoming video, or vice versa, a noise level discontinuity greater than 8 db is sometimes introduced in the output video signal which can be highly visible in the resultant television picture.

Thus, there are two basic problems associated with the control function D depicted in FIG. 1: first, the bypass action does not commence early enough to encompass the very start of the edge of waveform B, and it is turned off too soon to encompass the finish of the edge of the transmitted signal; and, it can cause abrupt noise level transitions to be introduced in the processed television picture. The primary object of the present invention is to overcome the above-outlined problems in noise-reducing systems of the integrating type and employing motion evaluation.

SUMMARY OF THE INVENTION

Briefly, the system according to the invention overcomes the above-described problems by effectively extending the period during which the incoming video signal or a large fraction thereof is coupled to the output by causing the start of the control function to occur sufficiently early, and its period to be extended in time by a sufficient amount, and by preventing instantaneous changes from large fractions of stored video to large fractions on incoming video, and vice versa, so as to eliminate from the signal coupled to the output terminal discontinuities that cause objectionable artifacts in the displayed picture. This is accomplished by generating one or more gating waveforms having durations determined by the difference in amplitude between the stored and incoming signals, which gating pulse or pulses cause a smooth or multi-stepped increase in the proportion of the amplitude of incoming signal coupled to the output terminal, delaying both the stored and incoming signals by a predetermined amount such that the onset of the gate pulse or pulses occurs sufficiently in advance of the delayed waveforms so as to function in an anticipatory manner, and delaying the turn off of the gating pulse or pulses by a predetermined amount sufficient to ensure that the incoming video signal, without discontinuities, is coupled to the output of the system during the period of the gating pulse or pulses, and by causing a smooth or multi-stepped transition to larger fractions of the stored signal to take place at the end of the gating pulse or pulses.

BRIEF DESCRIPTION OF THE DRAWINGS

Other objects, features and advantages of the invention will be evident, and its implementation and operation better understood, from the following detailed description taken in conjunction with the accompanying drawings, in which.

DESCRIPTION OF THE PREFERRED EMBODIMENT

Figure 1:
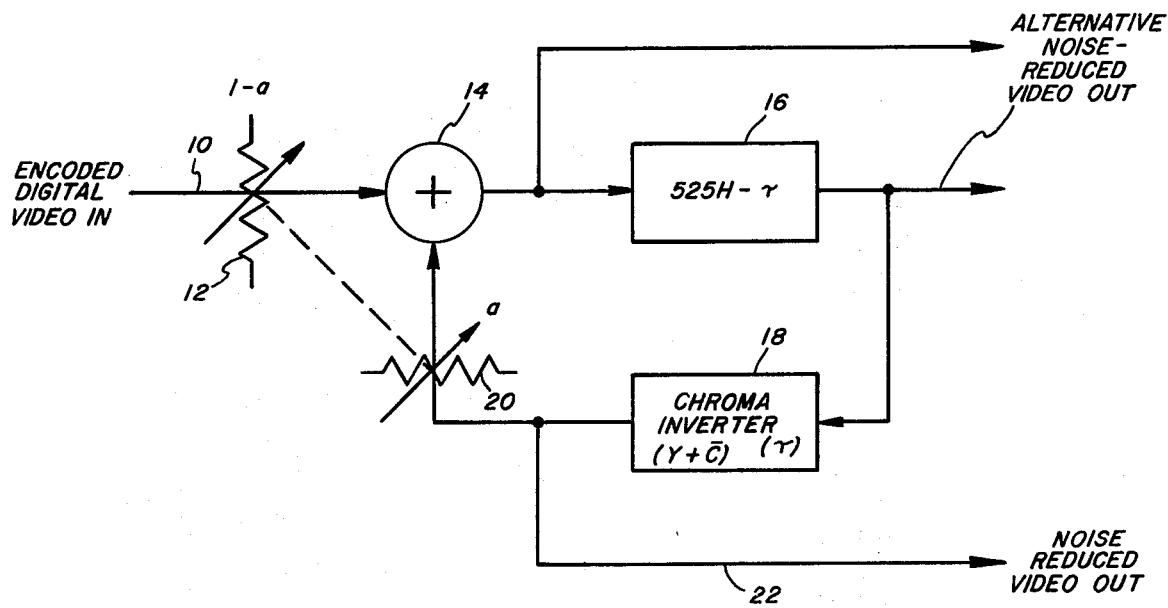
FIG. 1, to which reference has already been made, is a block diagram of a noise-reducing system in which the present invention is applicable.
Figure 3:
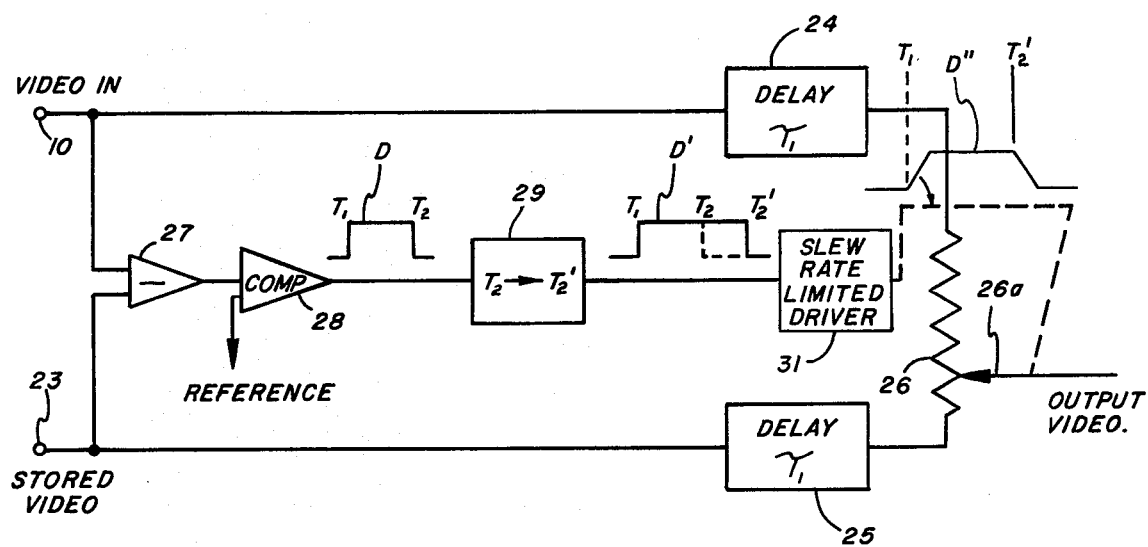
FIG. 3 is a functional block diagram illustraging the principles of the invention.
Figure 2:
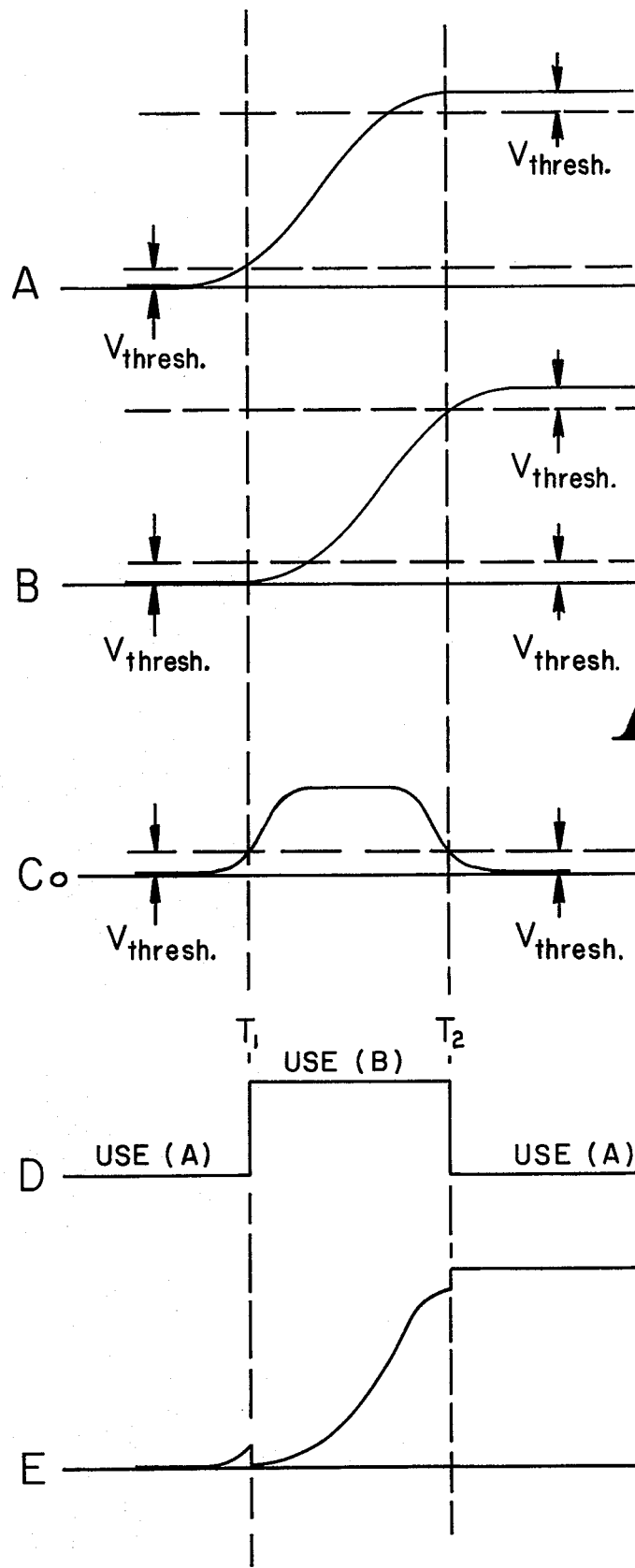
FIG. 2, referred to previously, is a series of waveforms illustrating the nature of the problem solved by the present invention.

Referring to FIG. 3, there is shown in simplified block diagram form a system which, in essence, performs the function of the summer 14 and the attenuators 12 and 20 schematically illustrated in FIG. 1. The incoming video signal is received on line 10 and applied to a first delay device 24, and a stored video signal (for example, from the chroma inverter 18 in the system of FIG. 1) is applied to a second delay device 25. Delay devices 24 and 25, which may be implemented in either the analog or the digital domain, and may be of any of several forms known to the art, each introduce a finite delay, $\tau_1$, to the signal applied thereto. The amount of the delay is arbitrarily determined, as by subjective examination of the displayed video material, and is at least of a duration sufficiently long to "anticipate" the onset of the control function D(FIG. 2) to prevent transmission of the signal discontinuity appearing at the left-hand portion of the waveform E to the output of the system. The output signals from delay devices 24 and 25 are applied to a summing device, shown symbolically as a potentiometer 26 to the terminals of which the delayed present and stored video signals are applied, with an output video signal taken from the wiper arm 26a of the potentiometer. The potentiometer is merely a symbolic representation of the fact that the sum of the present video and the stored video shall be constant at the output, but that the portions of each will vary as $(1 - a)$ and "$a$," respectively.

The control function D (FIG. 2) for causing an increase in the proportion of incoming video applied to the potentiometer 26 throughout its duration is generated by a subtracting device 27 and a comparator 28. More specifically, the incoming signal on line 10 is applied to one input terminal of subtracting device 27 and the stored video signal on line 23 is applied to the other terminal, and whenever a difference between the two input signals exists, signifying motion between the incoming and stored signals, a signal representing the difference appears at the output terminal of subtracting device 27. This difference signal is applied to comparator 28 which compares it with a reference voltage, comparable to the threshold voltage referred to in the discussion of FIG. 2. Whenever the difference between the incoming video and the stored video exceeds the reference voltage, regardless of the polarity of the difference, a gating pulse D which may be positive for the period that the reference voltage is exceeded, and whenever the reference voltage is exceeded, is generated at the output terminal of the comparator. As before, the onset of the gating pulse occurs at a time labeled $T_1$ and the turnoff of the gate pulse is labeled $T_2$.

As has been discussed above, it is necessary to extend the duration of gating pulse D by an amount sufficient to ensure that all transients in the incoming video signal that are going to take place have taken place before the incoming signal is coupled to the summing device 26. To this end, the gating pulse D is applied to a device 29 labeled $T_2 \rightarrow T_2'$, which signifies that device 29 delays by some arbitrary amount the turnoff of the gating pulse D. The function of the device 29 is illustrated by the waveform D' produced at the output of the device, wherein the turnoff of the gating pulse has been delayed by an arbitrary amount from $T_2$ to $T_2'$. The thus-produced gating pulse D' is applied to a slew rate limited driver 31, the function of which is to alter the rise time of the leading edge of waveform D' and the fall time of the trailing edge, as depicted by waveform D''. In essence, the device 31 ensures that the control signal D'' contains no excessively fast discontinuities or transitions; rise and fall times for waveform D'' in the order of 100 to 200 nanoseconds have been found to provide satisfactory transition periods in switching the output signal between large ratios of stored video through medium ratios of stored video to large ratios of incoming video. Alternatively, the desired rise and fall times of waveform D'' can be introduced with a low pass filter. The output of device 31 is used to control the position of the wiper arm 26a on the potentiometer 26 to change the proportions of the incoming and stored video coupled to the output terminal.

In summary, it is seen that the system of FIG. 3 includes means for generating in response to a difference between the incoming and stored video signals (signifying motion) a gating pulse for increasing the amount of incoming video coupled to the output of the system during the existence of the gating pulse, means for delaying the incoming and stored video signals by an arbitrary amount sufficient to ensure that the onset of the gating pulse will occur sufficiently in advance of the delayed incoming and stored video signals as to cause the gate pulse to act in an anticipatory manner, and means for delaying the turnoff of the gating pulse for delaying the return to a condition of coupling a greater amount of stored video signal to the summer, and hence to the output, and means for providing smooth transitions between different fractions of stored video and incoming video. As has been noted, the system of FIG. 3 may be implemented with either analog or digital means, and in each domain the components may take any of a variety of available forms.

While a system utilizing a single gating function has, for clarity, been used to describe the principles of the invention, it is to be understood that the invention is not so limited; it is possible to embody the concept in a system of the kind described in the aforementioned copending application and use any desired coefficient "$a$" for the amount of stored signal to be mixed with the incoming signal during the occurence of more than one gating pulse. How this is done will be seen from the following description of FIG. 4 in which the principles of the invention are incorporated in the motion detection system illustrated in FIG. 2 of the copending application.

Figure 4:
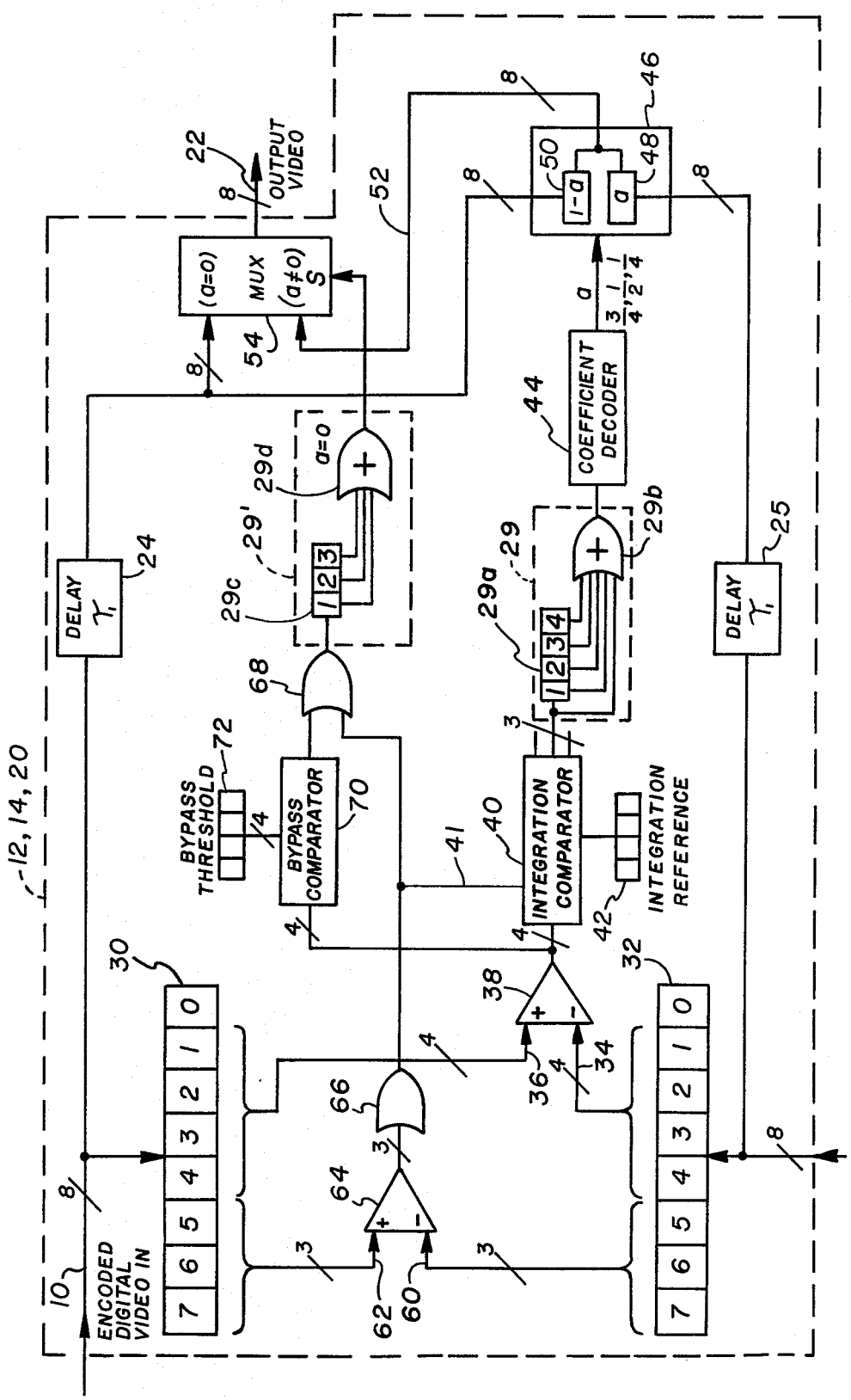
FIG. 4 is a functional block diagram of a system for evaluating motion between stored and present video frames in which the present invention is incorporated.

The system described in the copending application detects motion between stored frames and the present signal as the picture proceeds element-by-element through the system, and in response to the evaluation of such motion changes the value of the transmission factor "$a$" (and consequently $(1 - a)$) so as to alter the contribution of the stored past signals to the noise-reduced video output signal. FIG. 4, which corresponds in large measure to FIG. 2 of the copending application but modified to incorporate the present invention performs, in essence, the function of the summer 14 and the attenuators 12 and 20 schematically illustrated in FIG. 1. The incoming video signal is received on line 10 as an 8-bit PCM-encoded signal and applied to a suitable register, schematically shown at 30, which receives the individual bits of each word, the elements of which being labeled "0" for the least significant bit and "7" for the most significant bit. The stored video (also 8-bit PCM-encoded) is applied to a similar "register" 32, the elements of which are also labeled from "0" to "7" to represent the least and most significant bits, respectively. Motion is detected by comparing the stored video element-by-element (or byte-by-byte in 93 nanosecond slots) with the incoming video signal. That is, the 8-bit word representing the amplitude of the total past signal in storage is compared bit-by-bit with the 8-bit word that represents the amplitude of the incoming video signal. In the illustrated embodiment, the least significant bit is discarded in both cases, and because it was recognized that wide differences could not be tolerated, two levels of comparison are utilized. More specifically, bits 1, 2, 3 and 4 of the words representing the stored and incoming video are applied to the − and + input terminals 34 and 36, respectively, of a difference amplifier 38, the output from which is a 4-bit word representative of the difference, if any, between the stored and present video signals. The 4-bit word from the difference amplifier is applied to an integration comparator 40 which compares it to a 4-bit integration reference number, schematically illustrated at 42, having a predetermined value much greater than zero. The output from the integration comparator is a 3-bit word, each of the bits of which is utilized to determine in a coefficient decoder 44, the value of an "$a$" coefficient for determining the fractional amplitude proportion of the stored video signal to be added to the present video signal. In the present embodiment, it is possible to have several values of "$a$"; e.g., $\frac{3}{4}$, $\frac{1}{2}$ and $\frac{1}{4}$. In the case of zero difference at the output of integration comparator 40, indicative of the greatest tolerable motion, the coefficient "$a$" has a value of one-fourth, and when the differences at the output of comparator 40 is greater than zero, indicating less motion between the stored and present video than previously, the decoder produces a coefficient having a value of one-half, and when still less motion is detected, a coefficient having a value of three-fourths is produced.

To take care of the possibility of there being no difference in bits 1–4 of the stored and incoming video signals, yet a large difference actually existing between the stored and present signals which shows up in the more significant bits, a second comparison is made between bits 5, 6 and 7 of the stored video and the corresponding bits of the incoming video. To this end, the three most significant bits of the stored and present video are applied to the − and + input terminals 60 and 62, respectively, of a second difference amplifier 64, the 3-bit word output of which is applied to an OR circuit 66. When difference amplifier 64 detects a difference between the three most significant bits of the stored and present video, indicating that there is motion between them in excess of the allowable threshold established by the integration reference 42, the OR circuit 66 applies a signal to one input of a second OR circuit 68 which, in turn, produces an output signal which is ultimately applied to a multiplexer 54 which effectively causes the coefficient "$a$" to go to zero, that is, to couple only incoming video to the output terminal of the system. The output from OR circuit 66 is also applied to a control input 41 of integration comparator 40, forcing it to indicate zero difference at its output, indicative of the greatest tolerable motion.

For effectively delaying the time of turnoff of the gating pulse D, that is, the cessation of a full bypass of the incoming video to the output terminal, or the coupling of different fractions of the stored video to the output, a device 29 having the properties described in connection with FIG. 3 is provided for each of the three bits of the 3-bit word generated by integration comparator 40; for clarity, only one such device is illustrated, it being understood that a similar device may be provided for each of the other two control lines. The time of turnoff of device 29 is normally chosen to be different for each of the three bits of the 3-bit word generated by integration comparator 40 and also different from the time of turnoff of a somewhat similar device 29′ connected in the bypass control signal path. The device 29′, like device 29, delays the turnoff of control waveform D, and also delays the turn on time; thus, the "$a$" = 0 control signal will be delayed with respect to the other control signals "$a$" = $\frac{1}{2}$ or "$a$" = $\frac{1}{4}$, effectively allowing at least one intermediate value of "$a$" before going to "$a$" = 0. Hence, in the described digital embodiment the smooth rising edge of waveform D″ of FIG. 3 is implemented as a multi-stepped transition, and is operative to prevent instantaneous transitions from large fractions of stored signal in the output signal to an output signal consisting only of incoming video.

The delay introduced by device 29′ for turning of the bypass control signal is preferably shorter than the turnoff delay of device 29 for the gating pulses for each of the three exemplary values of the coefficient "$a$." Further, the gating pulse controlling the selection of a smaller coefficient "$a$" is made shorter than the gating pulses controlling the selection of a higher valued coefficient "$a$." This guarantees that after termination of larger than tolerable motion the output video signal will first cease being equal to the input video; that is, "$a$" will go from "$a$" = 0 to progressively greater values, first, "$a$" = $\frac{1}{4}$, then "$a$" = $\frac{1}{2}$, then "$a$" = $\frac{3}{4}$. In this digital implementation, then, the falling edge of waveform D″ in FIG. 3 is a series of steps rather than a continuous slope. However, it achieves the desired purpose of avoiding abrupt or instantaneous changes in the output video from large values of input video to large values of stored video.

In the system of FIG. 4, the device 29 may take the form of a 4-stage shift register 29a, the outputs of each stage of which, as well as the input to the first stage, are applied to a multiple input OR gate 29b. Assuming that device 29 is connected to the output line of integration comparator 40 that ultimately determines the coefficient "$a$" equal to one-half, and that when comparator 40 determines that one-half is the proper value of "$a$" a positive logic level (for example, a binary "one") appears on the output line, this binary "one" will be propagated down the shift register of N stages (four in this example), and the OR gate 29b receiving the binary "one" in addition to the outputs of each of the four stages will, in effect, extend any signal received by the shift register by an amount equal to the number of clock intervals, in this case four, required to propagate the binary "one" through the shift register. Thus, in the system of FIG. 1, in which the clocking interval is 93 nanoseconds, the device 29 as used in one of the outputs of integration comparator 40 is effective to prolong the turnoff of the gating pulse D by 372 nanoseconds.

The device 29′ in the bypass control channel is similar to device 29 and may take the form of a multi-stage shift register, in this case a 3-stage shift register, the outputs of each stage of which are applied to a multiple input OR gate 29d. In this case, however, unlike device 29, the input to the first stage is not applied to an input of OR gate 29d; this, in effect, causes the output from OR circuit 68 to be delayed an amount equal to one clock interval. Thus, in the system of FIG. 1, device 29′ delays the turn on of gating pulse D by 93 nanoseconds, and in addition, in a manner similar to the operation of device 29, prolongs the turnoff of gating pulse D by 279 nanoseconds, sufficient to ensure that all troublesome transients of the kind discussed in connection with FIG.

2 are accommodated, and to also take into account the time by which the incoming and stored video signals are delayed (to be described).

The coefficient "$a$" determined by coefficient decoder 44, in the form of a digital word, is applied to a summing device diagrammatically shown at 46, which includes two elements 48 and 50 labelled "$a$" and ($1 - a$), respectively, to signify the relative fractional amplitude proportions of the stored and present video, respectively, that are summed. In accordance with an essential feature of the present invention, the stored video is delayed in a device 25 by a predetermined time delay $\tau_1$ and applied to the element 48, and the present video signal is delayed a like amount by a delay device 24 and applied to the element 50. In the described digital system, delay devices 24 and 25 may take the form of a one or two byte shift register, which simply delays the input by one or two sampling intervals so that the output of the shift register occurs one or two sampling intervals later than the input. Thus, in this illustrative embodiment, $\tau_1$ would have a value of 93 or, alternatively, 186 nanoseconds. The delay may be longer than this, but it has been found that delays of this magnitude establish a sufficient anticipatory action. The sum of the respective amplitude portions of elements 48 and 50 is applied over line 52 (as an 8-bit word) as one input to multiplexer 54 which is operative to transmit a noise-reduced video signal to the output line 22 in situations when the value of coefficient "$a$" is not zero.

Although not absolutely necessary for the operation of the system, in order to obtain independence of action another circuit is provided for making the value of coefficient "$a$" go to zero under certain conditions. More particularly, the 4-bit word at the output of difference amplifier 38 is also applied to a bypass comparator 70 in which it is compared to a bypass threshold number, schematically shown at 72, which is a 4-bit word of a value somewhat greater than the value of the integration reference number 42. When the difference at the output of difference amplifier 38 exceeds the bypass threshold number, comparator 70 produces an output signal which is applied to a second input of OR circuit 68, which produces an output signal which is ultimately applied to multiplexer 54. Thus, the coefficient "$a$" will go to zero, causing only the present video signal to be coupled to the output line 22, when (1) there is any difference between the three most significant bits of the stored and present video signals, or (2) the difference between four less significant bits of the stored and present video signals exceeds a preselected bypass threshold number. For whatever reason th coefficient "$a$" is caused to go to zero, cessation of the full bypass of the incoming video signal is delayed by the device 29', and upon cessation of full bypass the coefficient "$a$" will go through one or more intermediate values before it takes on its largest value.

Summarizing the operation of the system of FIG. 4, when comparison of the stored and present video indicates less than a predetermined amount of motion, the system automatically operates to change the value of coefficient "$a$" in response to the amount of motion detected. In this situation, the summer 46 combines the present video in the proportion ($1 - a$) with the stored video in the proportion "$a$", and transmits the sum signal to the "not equal to zero" input of multiplexer 54 which, in turn, couples the sum signals to the output line 22. However, when the system detects motion between the stored and present video in excess of a predetermined amount, the coefficient "$a$" is reduced to zero, in which case only the present video signal is coupled to the output line 22. When the value of "$a$" is caused to go to zero, the entire past history of that picture element in which excessive motion was detected is lost and only the present video representing that element is used; thereafter the frame store has to build up a new past history for that particular element. It is seen that the digitally implemented system of FIG. 4 embodies the functional equivalent of the system schematically shown in FIG. 3 in that it includes means for generating in response to the difference between incoming and stored video signals a gating pulse or pulses for progressively increasing the amount of incoming video coupled to the output of the system as a function of motion during the existence of the gating pulse or pulses, means for delaying the incoming and stored video signals each by the same arbitrary amount, means for delaying the turnoff of the gating pulse or pulses for delaying the return to a condition of coupling a greater amount of stored video signal to the output of the noise reducing system, and means for progressively returning to a condition of coupling a greater amount of stored video signal to the output of the noise reducing system.

We claim:

1. In a system utilizing integration for reducing noise contained in arriving television video signals including means for storing a television video signal, controllable summing means having first and second input terminals and an output terminal for adding a first fractional amplitude portion of the signal stored in the storage means to a second fractional amplitude portion of the arriving video signal and producing at said output terminal a constant valued sum signal, and motion evaluation means for automatically and simultaneously changing said first and second fractional amplitude portions as a function of motion between the arriving video signal and the stored signal, and including means operative in response to a difference between the arriving video signal and the stored signal which exceeds a predetermined threshold value to generate a gating waveform having a duration corresponding to the time period that said difference exceeds said predetermined threshold value, and means for causing said controllable summing means to increase, during the existence of the gating waveform, the fractional amplitude portion of the arriving video signal and to decrease the fractional amplitude portion of the stored signal contained in the sum signal produced at said output terminal, the improvement in said motion evaluation means which comprises:

first and second signal coupling means for coupling said arriving video signal and said stored signal to the first and second input terminals, respectively, of said controllable summing means, said first and second coupling means each including means for delaying its coupled signal by a predetermined amount sufficient to cause the start of said gating waveform to be anticipatory of the delayed arriving video signal and delayed stored signal, and means for delaying by a predetermined amount the termination of said gating waveform thereby to produce an extended gating waveform and applying said extended gating waveform to said causing means, said extended gating waveform delaying a change to a decreased value of the fractional amplitude portion of the arriving video signal from that which existed during the gating waveform.

2. Improved motion evaluation means according to claim 1, further including means for modifying said extended gating waveform to provide a gradual transition from arriving video signal or from a large fractional amplitude portion of arriving video to a large fractional amplitude portion of stored video signal coupled to said output terminal, and means for further modifying said extended gating waveform to provide a gradual transition from a large fractional amplitude portion of stored video signal to arriving video signal or to a large fractional amplitude portion of arriving video signal coupled to said output terminal.

* * * * *